United States Patent
Lim et al.

(10) Patent No.: US 8,473,662 B2
(45) Date of Patent: Jun. 25, 2013

(54) INTERRUPT-HANDLING-MODE DETERMINING METHOD OF EMBEDDED OPERATING SYSTEM KERNEL

(75) Inventors: Dong-Hyouk Lim, Daejeon (KR); Yung-Joon Jung, Daejeon (KR); Yong-Bon Koo, Daejeon (KR); Chae-Deok Lim, Daejeon (KR); Dong-Sun Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 391 days.

(21) Appl. No.: 12/962,263

(22) Filed: Dec. 7, 2010

(65) Prior Publication Data
US 2011/0153894 A1 Jun. 23, 2011

(30) Foreign Application Priority Data

Dec. 18, 2009 (KR) .................. 10-2009-0126729
Jun. 3, 2010 (KR) .................. 10-2010-0052477

(51) Int. Cl.
*G06F 13/24* (2006.01)
(52) U.S. Cl.
USPC ........... 710/261; 710/260; 710/262; 710/263; 710/264
(58) Field of Classification Search
USPC ............... 710/48, 260–269; 718/100
See application file for complete search history.

(56) References Cited

U.S. PATENT DOCUMENTS

| | | | | |
|---|---|---|---|---|
| 5,630,141 A | * | 5/1997 | Ross et al. ..................... | 710/261 |
| 5,680,624 A | * | 10/1997 | Ross ............................... | 710/261 |
| 5,892,957 A | * | 4/1999 | Normoyle et al. ............ | 710/263 |
| 6,382,758 B1 | * | 5/2002 | Chausanski et al. ........... | 347/17 |
| 6,606,676 B1 | * | 8/2003 | Deshpande et al. ........... | 710/262 |
| 6,631,394 B1 | * | 10/2003 | Ronkka et al. ................ | 718/100 |
| 6,694,398 B1 | * | 2/2004 | Zhao et al. .................... | 710/260 |
| 6,711,643 B2 | * | 3/2004 | Park et al. ..................... | 710/260 |
| 6,880,030 B2 | * | 4/2005 | Brenner et al. ............... | 710/269 |
| 6,952,749 B2 | * | 10/2005 | Kim ............................... | 710/260 |
| 7,062,766 B2 | * | 6/2006 | Ronkka et al. ................ | 718/100 |
| 7,328,294 B2 | * | 2/2008 | Kim et al. ..................... | 710/260 |
| 7,363,409 B2 | * | 4/2008 | Ren et al. ...................... | 710/260 |
| 7,506,091 B2 | * | 3/2009 | Kershaw et al. .............. | 710/266 |

(Continued)

FOREIGN PATENT DOCUMENTS

| | | |
|---|---|---|
| KR | 10-1997-0002673 A | 1/1997 |
| KR | 10-0302585 B1 | 7/2001 |

(Continued)

OTHER PUBLICATIONS

Kjar, Michael. Setup and Use of the ARM Interrupt Controller (AITC). Application Note. Rev. 2. Jul. 2005.*
Sloss, Andrew. Interrupt Handling. Apr. 25, 2001.*
LaPonsey, Brian. Handling Multiple Interrupts on the MAC7100 Microcontroller Family. Application Note. Rev. 0. Nov. 2004.*

*Primary Examiner* — Matthew D Spittle

(57) ABSTRACT

Provided is a method capable of providing an improved response property appropriate for the characteristics of a system by automatically choosing an interrupt handling mode used for each device. The method is a method in which the embedded operating system kernel determines a handling mode for all individual interrupts, the method includes: dividing interrupt handling modes into a first interrupt handling mode and a second interrupt handling mode which has a different process speed from the first interrupt handling mode, and variably determining a distribution ratio in which each of the interrupts are distributed to the first interrupt handling mode or to the second interrupt handling mode according to a predetermined process condition during boot-up.

13 Claims, 3 Drawing Sheets

U.S. PATENT DOCUMENTS

| | | | |
|---|---|---|---|
| 7,730,248 B2 * | 6/2010 | Goss et al. | 710/261 |
| 7,882,293 B2 * | 2/2011 | Burdass et al. | 710/262 |
| 7,913,017 B2 * | 3/2011 | Wu et al. | 710/266 |
| 7,934,036 B2 * | 4/2011 | Conti et al. | 710/261 |
| 2006/0129704 A1 * | 6/2006 | Byers et al. | 710/15 |
| 2008/0162967 A1 * | 7/2008 | Wilson et al. | 713/322 |

FOREIGN PATENT DOCUMENTS

| | | |
|---|---|---|
| KR | 10-2003-0028601 | 4/2003 |
| KR | 10-2006-0062305 A | 6/2006 |
| KR | 10-2008-0029353 A | 4/2008 |

\* cited by examiner

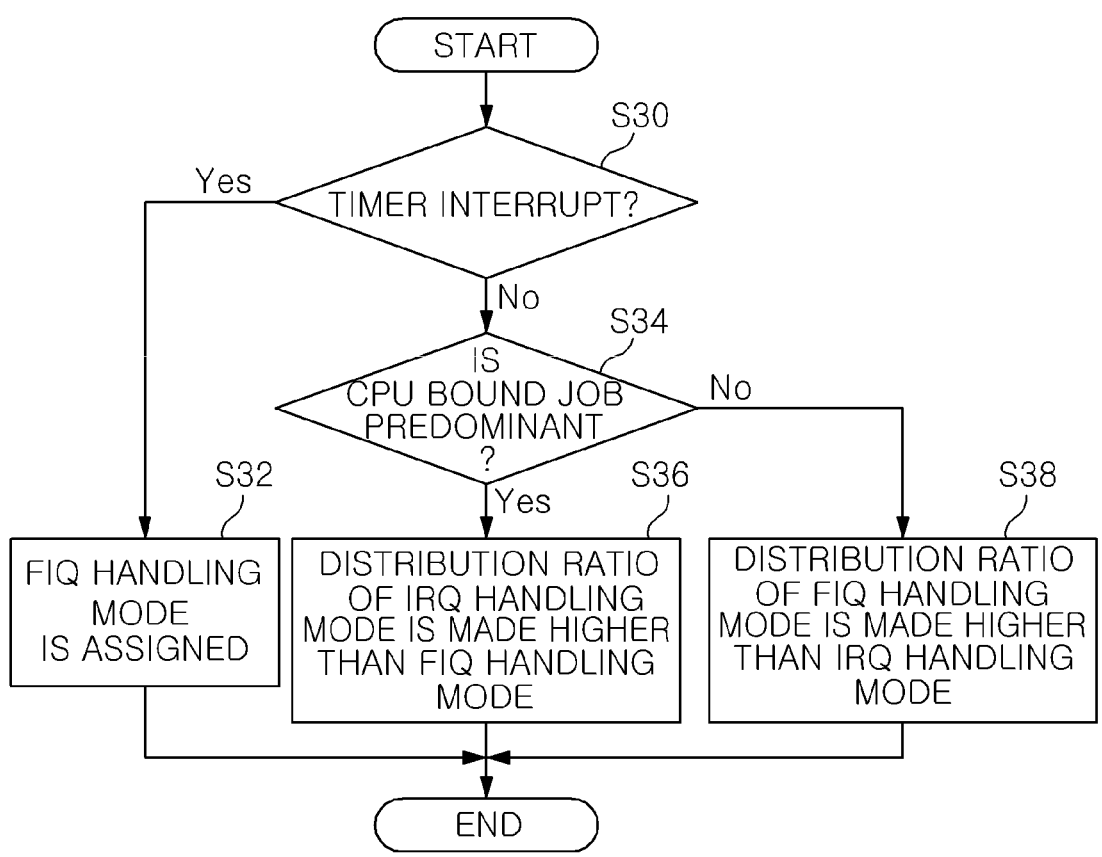

INTERRUPT-HANDLING-MODE DETERMINING METHOD OF EMBEDDED OPERATING SYSTEM KERNEL

CROSS REFERENCE TO RELATED APPLICATIONS

This application claims priority to Korean Patent Application Nos. 10-2009-0126729 and 10-2010-0052477 filed on Dec. 18, 2009 and Jun. 3, 2010, respectively, the entire contents of which are herein incorporated by reference.

BACKGROUND OF THE INVENTION

1. Field of the Invention

The present invention relates to an interrupt-handling-mode determining method of an embedded operating system kernel, and more particularly, to a method for providing a better response property by improving an interrupt handling process of a Linux kernel in an embedded operating system.

2. Description of the Related Art

An embedded system means a system capable of being effectively controlled since it is designed by installing a microprocessor serving as a brain in a mechanical or electric apparatus. That is, an embedded system means an apparatus that reads apparatus operating software from a built-in chip having the software, not from a disk, unlike a computer. Currently, portable phones, PDAs, digital TV sets, game machines, etc., are representative embedded systems.

These systems traditionally operate by using dedicated programs without operating systems, or operate by using simple operating systems and application programs.

The above-mentioned embedded systems increasingly require operating systems providing the latest technologies, rather than existing simple operating systems. In particular, the latest technologies are required for TCP/IP communication protocols on Internet, support of 32-bit high-speed CPU, etc.

Due to the above requirements, embedded system developers have adapted a Linux operating system as an embedded operating system that is economical and easily usable. This is because the Linux operating system can be freely modified and distributed according to GPL (GNU Public License) and has all functions required for modern operating systems.

Meanwhile, in order to improve an interrupt processing method regardless of characteristics of an ARM architecture, an embedded Linux kernel according to the related art uses an interrupt threading scheme to minimize an overhead during an interrupt process and adapts a scheme for improving a response property by expanding a region acquirable by prior occupation.

In other words, the embedded Linux kernel according to the related art executes kernel threads corresponding to individual IRQs (Internet requests) when the corresponding kernel is booted up. When interrupt occurs, an interrupt service routine (ISR) of the kernel is configured to perform a minimal process and to process most work in kernel threads corresponding to the individual interrupts.

As described above, the embedded Linux kernel according to the related art process interrupts by using only an IRQ (Internet request) mode.

SUMMARY OF THE INVENTION

The present invention has been made in an effort to provide an interrupt-handling-mode determining method of an embedded operating system kernel that is capable of performing an interrupt handling service by using a plurality of interrupt handling modes.

Further, the present invention has been made in an effort to provide an improved response property appropriate for the characteristics of a system by automatically choosing an interrupt handling mode used for each device.

An exemplary embodiment of the present invention provides an interrupt-handling-mode determining method of an embedded operating system kernel, which is a method in which the embedded operating system kernel determines a handling mode for all individual interrupts, the method comprises: dividing interrupt handling modes into a first interrupt handling mode and a second interrupt handling mode which has a different process speed from the first interrupt handling mode, and variably determining a distribution ratio in which each of the interrupts are distributed to the first interrupt handling mode or to the second interrupt handling mode according to a predetermined process condition during boot-up.

The first interrupt handling mode may be a FIQ (fast interrupt request) handling mode, and the second interrupt handling mode may be an IRQ (interrupt request) handling mode.

The interrupts may include a timer interrupt, and the timer interrupt may be unconditionally determined to an interrupt handling mode that has a higher process speed, among the first interrupt handling mode and the second interrupt handling mode.

The process condition may be a ratio of idle time of a CPU of an embedded system adapting the embedded operating system kernel.

The determining may comprise adjusting a distribution ratio of an interrupt handling mode having a higher process speed to be lower than a distribution ratio of an interrupt handling mode having a lower process speed, on the basis of the ratio of idle time of the CPU, when CPU bound job is predominant.

The determining may comprise a distribution ratio of an interrupt handling mode having a higher process speed to be higher than a distribution ratio of an interrupt handling mode having a lower process speed, on the basis of the ratio of idle time of the CPU, when I/O bound job is predominant.

The distribution ratio of the first interrupt handling mode and the second interrupt handling mode may be adjusted during job scheduling time.

the interrupts may each be classified into an interactive profile, an I/O oriented profile, and a throughput oriented profile.

In this case, the determining may comprise determining a handling mode of interrupts from a human interface apparatus as an interrupt handling mode that has a higher process speed, among the first interrupt handling mode and the second interrupt handling mode, when an interrupt is classified as the interactive profile.

the determining may comprise determining a handling mode of interrupts from a disk or a network apparatus as an interrupt handling mode that has a higher process speed, among the first interrupt handling mode and the second interrupt handling mode, when an interrupt is classified as the I/O oriented profile.

the determining may comprise determining a handling mode of the corresponding interrupts as an interrupt handling mode that has a lower process speed, among the first interrupt handling mode and the second interrupt handling mode, when an interrupt is classified as the throughput oriented profile.

the interrupts may be respectively first distributed to an interrupt handling mode that has a higher process speed, among the first interrupt handling mode and the second interrupt handling mode, on the basis of the number of times an interrupt handling mode is performed.

According to the exemplary embodiment of the present invention having the above-mentioned configuration, it is possible to divide interrupt handling modes of an ARM-based embedded Linux kernel into a FIQ handling mode and an IRQ handling mode and simultaneously use them.

In a case of peripheral devices using the FIQ handling mode, the peripheral devices have priorities for interrupt processes, resulting in an improvement in a response property.

Further, it is possible to improve the runtime function in handling interrupts without intervention of a user by adapting a method of dynamically performing interrupt-handling-mode setting.

BRIEF DESCRIPTION OF THE DRAWINGS

FIG. 3 is a flow chart illustrating an interrupt-handling-mode determining method of an embedded operating system kernel according to an exemplary embodiment of the present invention.

DETAILED DESCRIPTION OF THE PREFERRED EMBODIMENTS

Hereinafter, an interrupt-handling-mode determining method according to an exemplary embodiment of the present invention will be described below with reference to the accompanying drawings. It will be apparent to those skilled in the art that modifications and variations can be made in the present invention without deviating from the spirit or scope of the invention. Thus, it is intended that the present invention cover any such modifications and variations of this invention provided they come within the scope of the appended claims and their equivalents. Accordingly, such changes and modifications are seen to be within the true spirit and scope of the invention as defined by the appended claims. It will also be appreciated that the drawings and specification merely disclose typical embodiments of the invention and, although specific terms are employed, they are used in a generic and descriptive sense only and not for purposes of limitation.

Figure 1:
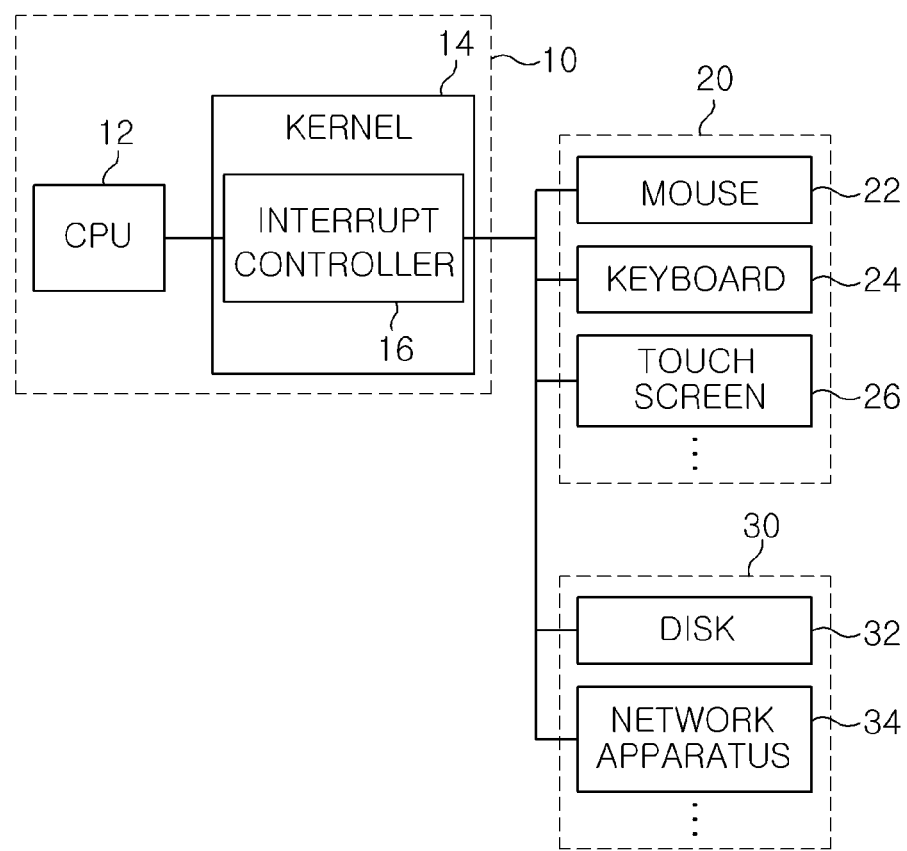
FIG. 1 is a drawing illustrating an example of a configuration of an embedded operating system using an interrupt-handling-mode determining method of an embedded operating system kernel according to an exemplary embodiment of the present invention.

FIG. 1 is a drawing illustrating an example of a configuration of an embedded system using an interrupt-handling-mode determining method of an embedded operating system kernel according to an exemplary embodiment of the present invention.

An embedded system 10 includes a CPU 12 and a modular kernel 14.

If receiving an interrupt from interrupt resources 20, 30, etc., through an interrupt controller 16 in the kernel 14, the CPU 12 performs a process corresponding thereto. The CPU 12 may be configured as an ARM processor.

The kernel 14 is the core of an operating system of the embedded system 10. The kernel 14 includes the interrupt controller 16 (also referred to as an interrupt processor) for processing all requests to competitively require a service of the kernel such as a completed I/O operation, a scheduler (not shown) for determining which programs share a process time of the kernel in what order, and a supervisor (not shown) for actually giving the right of using of a computer to individual processors after scheduling finishes.

The interrupt controller 16 divides interrupt handling modes into a first interrupt handling mode and a second interrupt handling mode different from each other in the process speed. For example, the interrupt controller 16 sets a value of an interrupt mode register (not shown) to different values in order to divide the interrupt handling modes into the first interrupt handling mode and the second interrupt handling mode. Here, the first interrupt handling mode may be a FIQ (fast interrupt request) handling mode, and the second interrupt handling mode may be an IRQ (internet request) handling mode. It may be understood that the FIQ handling mode and the IRQ handling mode are conceptually the same except that the process speed of the FIQ handling mode is faster.

If receiving interrupt requests from the interrupt resources 20, 30, etc., the interrupt controller 16 sets the FIQ (fast interrupt request) handling mode or the IRQ (interrupt request) handling mode according to a kind of each of corresponding interrupts. For example, if the kind of interrupt is a timer interrupt, the interrupt controller 16 unconditionally sets the FIQ handling mode. This is because the number of times that the timer interrupt is handled for each hour is the largest.

Meanwhile, the interrupt controller 16 adapts a method in which a distribution ratio of interrupt handling modes varies according to the process situation of the CPU 12. That is, according to the ratio of idle time of the CPU 12, when a CPU bound job (a process mainly using the CPU 12) is predominant, the distribution ratio of the FIQ handling mode and the IRQ handling mode is changed to, for example, 20:80. When I/O bound job (process mainly performing input/output) is predominant, the distribution ratio of the FIQ handling mode and the IRQ handling mode is changed to, for example, 80:20. In other words, the kernel 14 can find a ratio of the current I/O bound job and the CPU bound job by self-monitoring, which makes it possible for the interrupt controller 16 to variably adjust the distribution ratio of the FIQ handling mode and the IRQ handling mode.

The interrupt controller 16 adjusts the above-mentioned distribution ratio of the FIQ handling mode and the IRQ handling mode during job scheduling time. When a current process exhausts time assigned to it, it returns the CPU and is replaced with the next process. This time is referred to as job scheduling time. During the job scheduling time, a context switch occurs, and in this case, the distribution of interrupt handling modes is adjusted.

The interrupt controller 16 finds out and lists resources 20, 30, etc. during boot-up.

The embedded system 10 should interactively operate in some situations, mainly perform an I/O operation in some situations, and mainly perform a throughput operation in some situations. In the exemplary embodiment of the present invention, profiles of interrupts are generally classified into an interactive profile, an I/O oriented profile, and a throughput oriented profile. In a case of an interactive profile, since a response property to a user's input is important, the interrupt controller 16 makes interrupts from a human interface apparatus 20 such as a mouse 22, a keyboard 24, a touch screen 26, etc., to be mainly handled in the FIQ handling mode. In a case of an I/O oriented profile, the interrupt controller 16 makes interrupts from an interrupt resource 30 such as a disk 32 or a network apparatus 34 to be handled in the FIQ handling mode. In a case of a throughput oriented profile, the interrupt controller 16 makes interrupt handling to be performed in the IRQ handling mode without using the FIQ handling mode. Of cause, the user can variably adjust priorities for those interrupts. Meanwhile, although profiles of interrupts are generally classified into an interactive profile, an I/O oriented profile, and a throughput oriented profile in the exemplary embodiment of the present invention described above, the user can set categories according to the user's situation and add new categories.

Also, the interrupt controller 16 may first set the FIQ handling mode on the basis of the number of times the interrupt handling modes are performed with respect to all individual interrupts.

Figure 2:
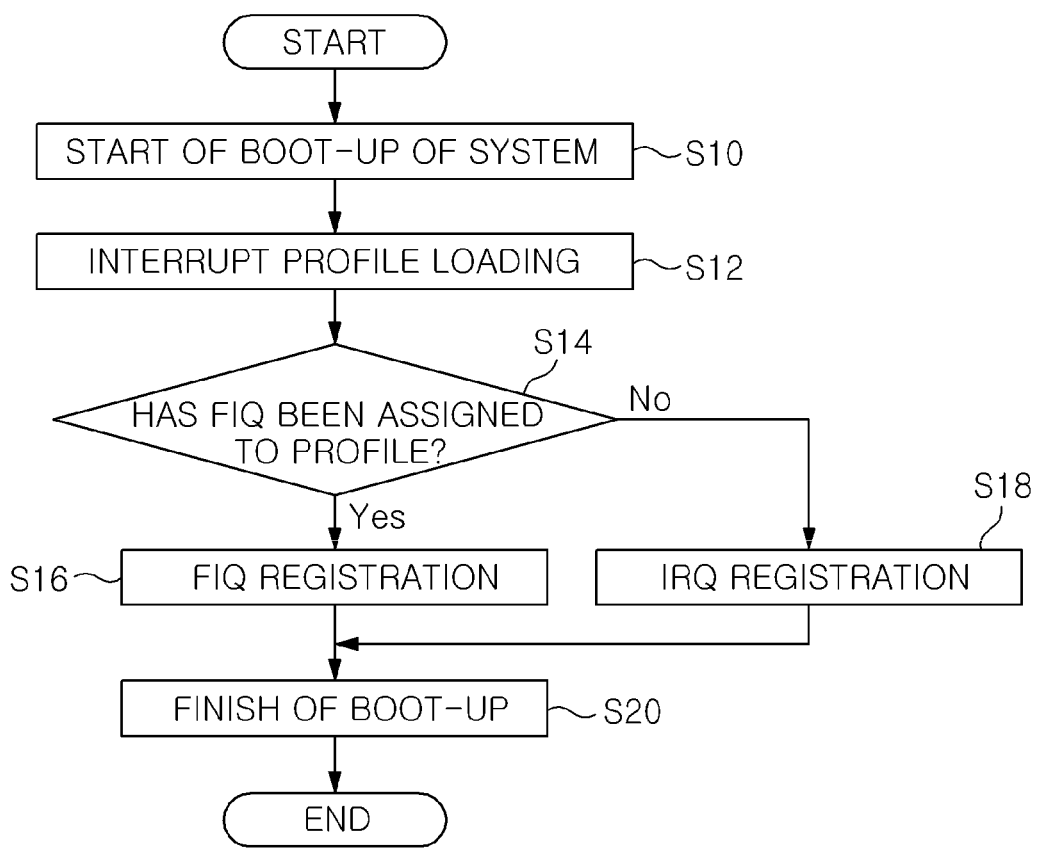
FIG. 2 is a flow chart schematically illustrating an operation until boot-up of an embedded system adapting an interrupt-handling-mode determining method of an embedded operating system kernel according to an exemplary embodiment of the present invention is completed.

FIG. 2 is a flow chart schematically illustrating an operation until boot-up of an embedded system adapting an interrupt-handling-mode determining method of an embedded operating system kernel according to an exemplary embodiment of the present invention is completed.

When boot-up of an embedded system 10 starts (S10), an interrupt controller 16 in a kernel 14 loads an interactive profile, an I/O oriented profile, a throughput oriented profile, etc., with regard to all interrupt resources 20, 30, etc. (S12).

Subsequently, the interrupt controller 16 determines whether a FIQ has been assigned to a loaded interrupt profile (S14).

If a FIQ has been assigned ('Yes' in S14), the interrupt controller 16 performs registration in order to handle a corresponding interrupt in the FIQ handling mode (S16). In contrast, if a FIQ has not been assigned ('No' in S14), the interrupt controller 16 performs registration in order to handle the corresponding interrupt in the IRQ handling mode (S18).

Registered contents are transmitted to the CPU 12. When the CPU 12 performs the corresponding interrupt in a registered interrupt handling mode, the boot-up is completed (S20).

FIG. 3 is a flow chart illustrating an interrupt-handling-mode determining method of an embedded operating system kernel according to an exemplary embodiment of the present invention in detail. A feature of the exemplary embodiments of the present invention is to determine whether to handle a certain interrupt in the FIQ handling mode or in the IRQ handling mode. Accordingly, hereinafter, how to assign the FIQ handling mode and the IRQ handling mode in a process from start to finish of boot-up of the embedded system 10 described above with reference to FIG. 2 will be mainly described.

First, the interrupt controller 16 determines whether the kind of interrupt is a timer interrupt (S30).

If the kind of interrupt is a timer interrupt ('Yes' in S30), the interrupt controller 16 unconditionally assigns the FIQ handling mode to the corresponding interrupt (S32). This is because the number of times that the timer interrupt is handled for each hour is the largest.

In contrast, if the kind of interrupt is not a timer interrupt ('No' in S30), the interrupt controller 16 uses a scheme in which the distribution ratio of the interrupt handling modes varies according to the process situation of the CPU 12.

For example, according to the ratio of idle time of the CPU 12, when a CPU bound job (a process mainly using the CPU 12) is predominant ('Yes' in S34), the interrupt controller 16 changes the distribution ratio of the FIQ handling mode and the IRQ handling mode to, for example, 20:80. As such, when the kind of interrupt is not a timer interrupt, if the CPU bound job is predominant, the ratio of the IRQ handling mode is made higher than the ratio of the FIQ handling mode (S36).

In contrast, when I/O bound job (process mainly performing input/output) is predominant instead of the CPU bound job ('No' in S34), the interrupt controller 16 changes the distribution ratio of the FIQ handling mode and the IRQ handling mode to, for example, 80:20. As such, when the kind of interrupt is not a timer interrupt, if the I/O bound job is predominant, the ratio of the FIQ handling mode is made higher than the ratio of the IRQ handling mode (S38).

Although the exemplary embodiments of the present invention have been described above with reference to the accompanying drawings, they are used in a generic and descriptive sense only and not for purposes of limitation. It will be apparent to those skilled in the art that modifications and variations can be made in the present invention without deviating from the spirit or scope of the invention.

What is claimed is:

1. An interrupt-handling-mode determining method of an embedded operating system kernel in which the embedded operating system kernel determines handling modes of all interrupts, comprising:
    dividing interrupt handling modes into a first interrupt handling mode and a second interrupt handling mode which has a different process speed from the first interrupt handling mode; and
    variably determining a distribution ratio in which each of the interrupts are distributed to the first interrupt handling mode or to the second interrupt handling mode according to a predetermined process condition during boot-up.

2. The interrupt-handling-mode determining method of an embedded operating system kernel according to claim 1, wherein:
    the first interrupt handling mode is a FIQ (fast interrupt request) handling mode.

3. The interrupt-handling-mode determining method of an embedded operating system kernel according to claim 1, wherein:
    the second interrupt handling mode is an IRQ (interrupt request) handling mode.

4. The interrupt-handling-mode determining method of an embedded operating system kernel according to claim 1, wherein:
    the interrupts includes a timer interrupt, and
    the timer interrupt is unconditionally determined as an interrupt handling mode that has a higher process speed, among the first interrupt handling mode and the second interrupt handling mode.

5. The interrupt-handling-mode determining method of an embedded operating system kernel according to claim 1, wherein:
    the process condition is a ratio of idle time of a CPU of an embedded system adapting the embedded operating system kernel.

6. The interrupt-handling-mode determining method of an embedded operating system kernel according to claim 5, wherein the determining comprising:
    adjusting a distribution ratio of an interrupt handling mode having a higher process speed to be lower than a distribution ratio of an interrupt handling mode having a lower process speed, on the basis of the ratio of idle time of the CPU, when CPU bound job is predominant.

7. The interrupt-handling-mode determining method of an embedded operating system kernel according to claim 5, wherein the determining comprising:
    adjusting a distribution ratio of an interrupt handling mode having a higher process speed to be higher than a distribution ratio of an interrupt handling mode having a lower process speed, on the basis of the ratio of idle time of the CPU, when I/O bound job is predominant.

8. The interrupt-handling-mode determining method of an embedded operating system kernel according to claim 1, wherein:
the distribution ratio of the first interrupt handling mode and the second interrupt handling mode is adjusted during job scheduling time.

9. The interrupt-handling-mode determining method of an embedded operating system kernel according to claim 1, wherein:
the interrupts are each classified into an interactive profile, an I/O oriented profile, and a throughput oriented profile.

10. The interrupt-handling-mode determining method of an embedded operating system kernel according to claim 9, wherein the determining comprising:
determining a handling mode of interrupts from a human interface apparatus as an interrupt handling mode that has a higher process speed, among the first interrupt handling mode and the second interrupt handling mode, when an interrupt is classified as the interactive profile.

11. The interrupt-handling-mode determining method of an embedded operating system kernel according to claim 9, wherein the determining comprising:
determining a handling mode of interrupts from a disk or a network apparatus as an interrupt handling mode that has a higher process speed, among the first interrupt handling mode and the second interrupt handling mode, when an interrupt is classified as the I/O oriented profile.

12. The interrupt-handling-mode determining method of an embedded operating system kernel according to claim 9, wherein the determining comprising:
determining a handling mode of the corresponding interrupts as an interrupt handling mode that has a lower process speed, among the first interrupt handling mode and the second interrupt handling mode, when an interrupt is classified as the throughput oriented profile.

13. The interrupt-handling-mode determining method of an embedded operating system kernel according to claim 1, wherein:
the interrupts are respectively first distributed to an interrupt handling mode that has a higher process speed, among the first interrupt handling mode and the second interrupt handling mode, on the basis of the number of times an interrupt handling mode is performed.

* * * * *